US007993741B2

(12) United States Patent  
Hartig et al.

(10) Patent No.: US 7,993,741 B2  
(45) Date of Patent: Aug. 9, 2011

(54) PREVENTING DAMAGE WITH SEPARATORS (75) Inventors: Klaus Hartig, Avcoa, WI (US); Leah M. Miller, Avoca, WI (US); Gary L. Pfaff, Cazenovia, WI (US)

(73) Assignee: Cardinal CG Company, Eden Prairie, MN (US)

( * ) Notice: Subject to any disclaimer, the term of this patent is extended or adjusted under 35 U.S.C. 154(b) by 171 days.

(21) Appl. No.: 10/313,543

(22) Filed: Dec. 6, 2002

(65) Prior Publication Data

US 2004/0109982 A1 Jun. 10, 2004

(51) Int. Cl.  
*B32B 5/16* (2006.01)  
*B32B 17/06* (2006.01)

(52) U.S. Cl. ........ 428/323; 428/325; 428/326; 428/426; 428/441; 428/689

(58) Field of Classification Search .................. 428/432, 428/426, 422, 323, 325, 326, 327, 328, 331, 428/435, 441, 457, 343, 409, 687, 355 R  
See application file for complete search history.

(56) References Cited

U.S. PATENT DOCUMENTS

| | | | |
|---|---|---|---|
| 3,577,256 A * | 5/1971 | Benford, Jr. et al. ......... 428/34.7 |
| 3,723,317 A | 3/1973 | Hay, Jr. ........................... 252/11 |
| 3,798,112 A | 3/1974 | Hay, Jr. ........................... 161/162 |
| 3,806,956 A * | 4/1974 | Supkis et al. ................... 451/59 |
| 4,011,359 A * | 3/1977 | Simpkin et al. ................ 428/326 |
| 4,127,683 A * | 11/1978 | Flemmer et al. .............. 427/287 |
| 4,200,670 A | 4/1980 | Albach .......................... 427/154 |
| 4,263,371 A | 4/1981 | Franz ............................ 428/432 |
| 4,360,544 A | 11/1982 | Franz et al. .................... 427/165 |
| 4,447,496 A | 5/1984 | Franz et al. .................... 428/432 |
| 4,487,807 A | 12/1984 | Duffer et al. .................. 428/422 |
| 4,489,106 A | 12/1984 | Duffer et al. .................. 427/154 |
| 4,529,648 A | 7/1985 | Duffer et al. .................. 428/326 |
| 4,530,889 A | 7/1985 | Duffer et al. .................. 428/326 |
| 4,568,605 A | 2/1986 | Duffer et al. .................. 428/326 |
| 4,606,946 A | 8/1986 | Duffer et al. .................. 427/384 |
| 5,026,597 A | 6/1991 | Franz et al. .................... 428/323 |
| 5,302,449 A * | 4/1994 | Eby et al. ....................... 428/336 |
| 5,418,006 A * | 5/1995 | Roth et al. ..................... 427/154 |
| 5,451,457 A | 9/1995 | McCurdy et al. ............. 428/441 |
| 5,607,753 A * | 3/1997 | Parks ............................. 428/210 |
| 5,609,924 A | 3/1997 | McCurdy et al. ............. 427/475 |
| 5,644,898 A | 7/1997 | Shepherd et al. ............... 53/445 |
| 5,698,262 A * | 12/1997 | Soubeyrand et al. ..... 427/255.19 |
| 5,725,956 A * | 3/1998 | McCurdy et al. ............. 428/441 |
| 6,220,437 B1 | 4/2001 | Knoy, Jr. et al. ............... 206/454 |
| 6,412,307 B2 * | 7/2002 | Demiryont .................... 65/60.2 |
| 2002/0176988 A1* | 11/2002 | Medwick et al. ............. 428/408 |
| 2003/0110800 A1* | 6/2003 | He et al. ........................... 65/23 |
| 2003/0228470 A1* | 12/2003 | Allaire et al. ................ 428/426 |

FOREIGN PATENT DOCUMENTS

| | | |
|---|---|---|
| DE | 137 214 | 8/1979 |
| WO | 92/08555 | 5/1992 |
| WO | WO 02/22517 | * 3/2002 |

* cited by examiner

*Primary Examiner* — Gwendolyn Blackwell  
(74) *Attorney, Agent, or Firm* — Fredrikson & Byron, PA (57) ABSTRACT

Methods and apparatus for useful for protecting a substrate bearing a coating are provided. A separator in accordance with an exemplary embodiment of the present invention comprises a film carrying a plurality of particles Each particle preferably has a covered area adhered to the film and an exposed area that is larger than the covered area.

18 Claims, 7 Drawing Sheets

PREVENTING DAMAGE WITH SEPARATORS

FIELD OF THE INVENTION

The present invention relates generally to methods and apparatus for handling material More particularly the present invention relates to methods and apparatus for protecting sheets of material during storage, transportation and handling.

BACKGROUND OF THE INVENTION

Glass sheets are sometimes transported in packs having of a plurality of sheets banded together. Particles are sometimes placed between adjacent sheets in the stack. Often times these particles make scratches that look like worm trails. These worm trails are particularly visible on coated glass, where the optical appearance of the coating is dramatically changed if part or all of the reflective coating is removed by the particle during the creation of the trail. However, even uncoated glass can become scratched. In some cases, groups of particles may gather together to form clusters. Clusters of particles may be even more likely to cause damage since they are larger than individual particles. Methods in accordance with the present invention may be used to eliminate the creation of worm trails.

SUMMARY OF THE INVENTION

The present invention relates generally to methods and apparatus for handling material for the insulating glass industry. More particularly, the present invention relates methods and apparatus for protecting sheets of material during storage, transportation and handling. A separator in accordance with an exemplary embodiment of the present invention comprises a film carrying a plurality of particles.

In one aspect of the invention, a covered area of each particle is preferably adhered to the film and an exposed area of the particle is generally larger than the covered area. In certain useful embodiments, the exposed area is more than 10 times larger than the covered area. In certain advantageous embodiments, the exposed area is more than 100 times larger than the covered area. In certain particularly advantageous embodiments, the exposed area is more than 300 times larger than the covered area.

In another aspect of the invention, the particles are disposed in a generally spaced relationship relative to one another (i.e, there are spaces between adjacent particles). Adhering the particles to the film in a generally spaced relationship advantageously reduces the likelihood that a plurality of particles will cluster together. In certain useful embodiments, an average spacing between adjacent particles is greater than the an average diameter of the particles. In certain advantageous embodiments, an average spacing between adjacent particles is greater than about 5 times an average diameter of the particles. In certain particularly advantageous embodiments, an average spacing between adjacent particles is greater than about 10 times an average diameter of the particles.

In some implementations, the coating to be protected includes at least one silver layer and the film comprises a composition that is substantially non-corrosive to the at least one silver layer of the coating. In one aspect of the present invention, the film may comprise a composition having a substantially neutral ph. In certain useful embodiments, the film comprises a material having a ph of between about 5.0 and about 9.0. In certain advantageous embodiments, the film comprises a material having a ph of between about 5.0 and about 8.0. In certain particularly advantageous embodiments, the film comprises a material having a ph of between about 5.0 and about 7.0

In certain implementations the film comprises a composition having a first state in which the composition can be easily applied the coating born by the sheet and a second state in which the composition forms a tacky film adhered to the coating. In some of these implementations, the composition is curable to a third state in which the composition forms a less tacky film.

In an additional useful aspect of the invention, the film comprises a water soluble composition, and the film has a film thickness selected so that the film is easily removed with water. In certain useful embodiments, the film has a film thickness that is less than about 8.0 microns. In certain advantageous embodiments, the film has a film thickness that is less than about 1.0 micron. In one exemplary embodiment, the film has a film thickness of about 0.8 microns.

In certain advantageous implementations, the separator comprises a film having a film thickness which is less than an average diameter of the particles of the separator. In certain advantageous embodiments, the difference between the film thickness and the average diameter of the particles is sufficient to prevent contact between the film and a second substrate resting on exposed areas of the particles. It is important to note that some film materials may swell during transportation, for example, due to changes in humidity. When this is the case, swelling of the film is preferably taken into account when selecting the difference between the film thickness and the average diameter. In certain useful embodiments, the average particle diameter is more than 10 times greater than the film thickness. In certain advantageous embodiments, the average particle diameter is more than 100 times greater than the film thickness. In certain particularly advantageous embodiments, the average particle diameter is more than 300 times greater than the film thickness An exemplary method in accordance with the present invention includes the steps of applying a composition to the substrate so that the composition forms a film overlaying the coating, and adhering a plurality of particles to the film. In some cases, the step of applying the composition to the substrate is performed while the composition is in a first, liquid state and the step of adhering the plurality of particles to the film is performed while the composition is in a second state in which the composition forms a tacky film. Methods in accordance with the present invention may also include the step of curing the composition so as to form a less tacky film.

DETAILED DESCRIPTION

The following detailed description should be read with reference to the drawings, in which like elements in different drawings are numbered identically. The drawings depict selected embodiments and are not intended to limit the scope of the invention. It should be noted that the drawings are not necessarily to scale, for example, the dimensions of some elements may be exaggerated for purposes of illustration. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Figure 1:
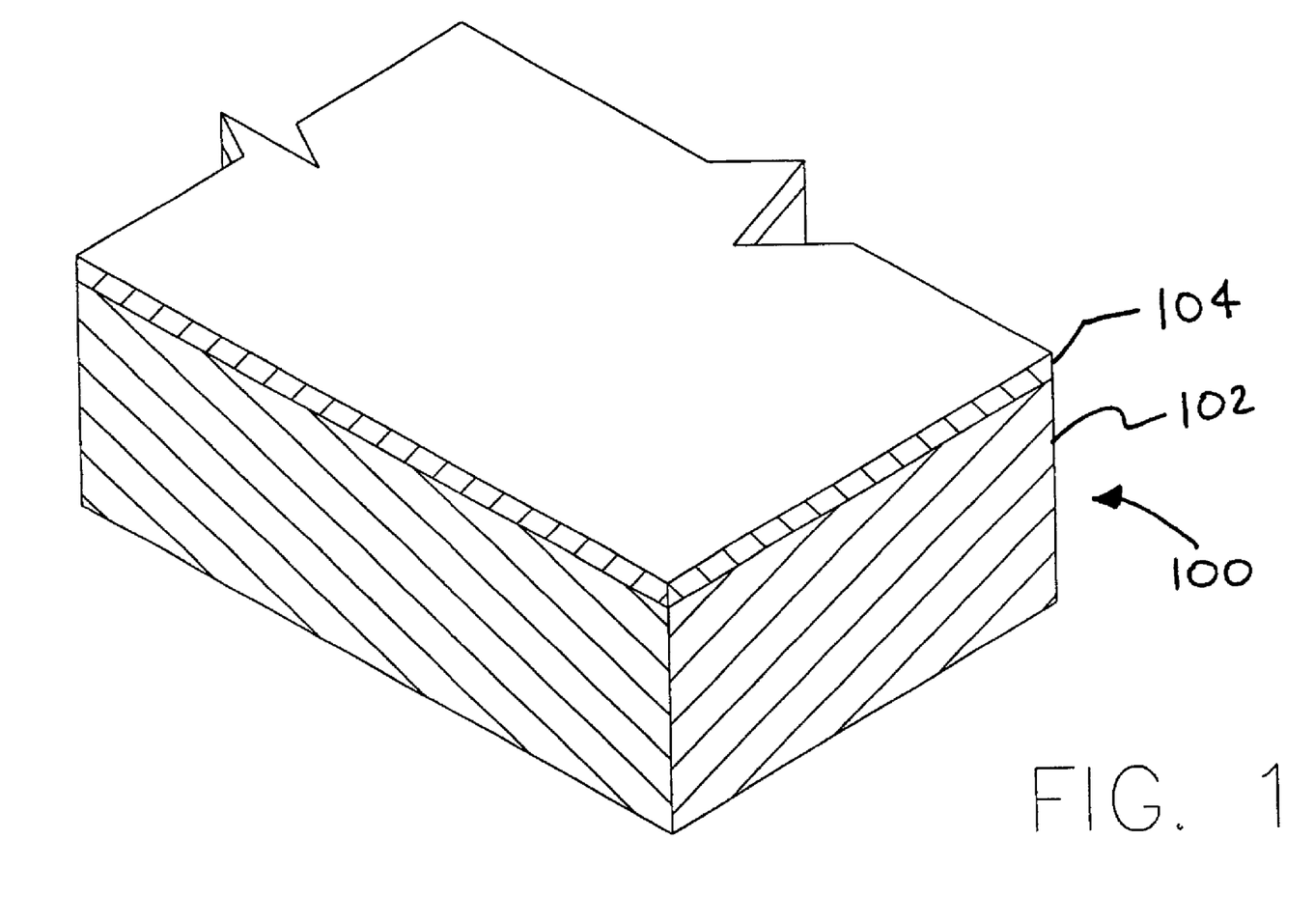
FIG. 1 is a perspective view of a sheet in accordance with an exemplary embodiment of the present invention.

FIG. 1 is a perspective view of a sheet 100 in accordance with an exemplary embodiment of the present invention. Sheet 100 includes a substrate 102 and a coating 104 overlaying substrate 102. Substrate 102 may comprise various materials without deviating from the spirit and scope of the present invention. Examples of materials which may be applicable to some applications include glass, marble, stainless steel, and polymeric materials. Examples of glass materials which may be suitable in some applications include soda-lime glass, alkali-lime-silicon dioxide glass, boro-silicon dioxide glass, alumino-silicon dioxide glass, boro-alumino silicon dioxide glass, phosphate glass, and fused silicon dioxide. It should be noted that substrate 102 is not required to be transparent For example, substrate 102 may be opaque and/or translucent in some cases In some embodiments of the present invention, coating 104 may comprise a low-emissivity coating. It should be noted that various types of low-emissivity coatings can be used in connection with the present invention. For example, useful low-emissivity coatings are described in U.S. Pat. Nos. 5,302, 449 and 5,834,103 as well as in U.S. patent application Ser. No. 10/087,662 the entire contents of each of which are hereby incorporated by reference in there entirety. A low-emissivity coating in accordance with the present invention may include, for example, one or more layers of infrared-reflective material (e.g., silver) and one or more layers of transparent dielectric film (e.g., metal oxides and/or metal nitrides). The infrared-reflective layers, which are typically conductive metals such as silver, gold, or copper, reduce the transmission of radiant heat through the coating. The transparent dielectric film layers may be used to reduce visible reflectance and to control other properties of the coatings, such as color. Commonly used transparent dielectrics include oxides of zinc, tin, indium, bismuth, and titanium, and alloys and mixtures thereof as well as nitrides such as silicon nitride. Low-emissivity coatings are commonly deposited on glass substrates through the use of well known magnetron sputtering techniques.

In some cases, coating 104 may comprise material that is easily scratched (e.g., the coating 104 may be a silver based coating). Even when coating 104 includes a relatively hard overcoat, scratching may occur when softer layers (e.g., silver layers) beneath the overcoat are unable to provide sufficient support for the overcoat. For example, scratching may occur when a softer layer under the overcoat is plastically deformed. Methods and apparatus in accordance with the present invention may be advantageously used to protect coating 104 during transportation of sheet 100 to a desired destination such as, for example, an insulating glass unit assembly facility (as well as during storage and handling).

Figure 2:
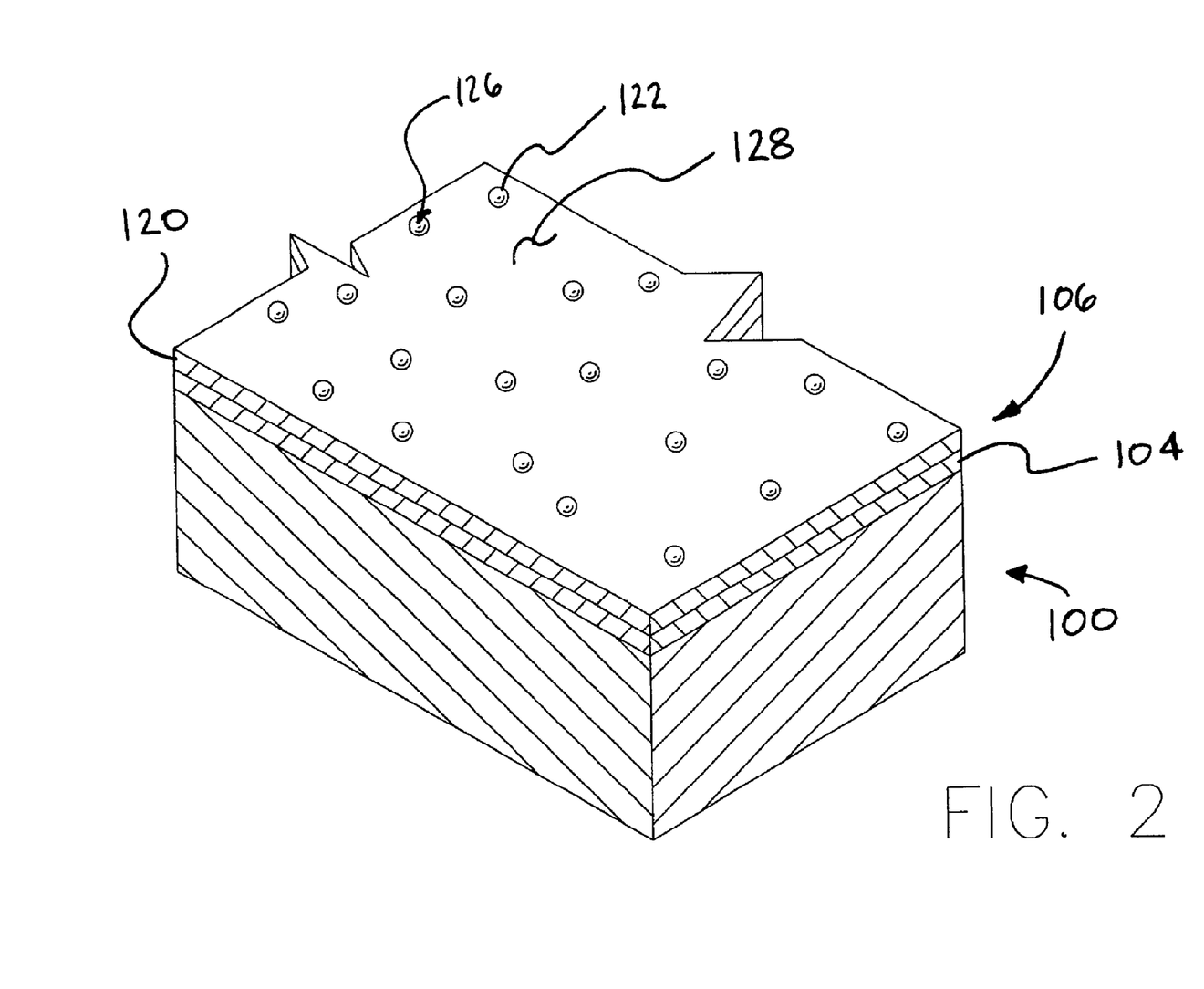
FIG. 2 is a perspective view of an assembly including the sheet shown in the previous figure.

FIG. 2 is a perspective views of an assembly including sheet 100 shown in the previous figure. In the embodiment of FIG. 2, a separator 106 is shown overlaying coating 104 of sheet 100. In FIG. 2, it may be appreciated that separator 106 comprises a film 120 that is carrying a plurality of particles 122, each having exposed area 126. Film 120 acts to protect coating 104, for example, when a plurality of sheets are arranged in an assembly for shipping. It should be noted that FIG. 2 is not necessarily drawn to scale. In some embodiments, for example, the relative thicknesses of coating 104 and film 120 may be different than they appear in FIG. 2.

In the embodiment of FIG. 2, particles 122 are disposed in a spaced relationship relative to one another (i.e., there are spaces 128 between adjacent particles). Adhering particles 122 to film 120 in a generally spaced relationship preferably reduces the likelihood that a plurality of particles will cluster together. This is considered to be preferably since clusters of particles are believed to be particularly likely to cause damage as noted above.

Film 120 may comprise various materials without deviating from the spirit and scope of the present invention. In some embodiments, film 120 comprises a masking material which is adapted to be sprayed onto a workpiece. In a preferred embodiment, film 120 comprises a composition having a first state in which the composition can be easily applied to sheet 100 and a second state in which the composition forms a tacky film (e.g., a sticky film) adhered to coating 104 of sheet 100. In some embodiments, the composition is curable to a third state in which the composition forms a less tacky film (e.g., a non-tacky film or a non-sticky film).

In a preferred embodiment, film 120 comprises a water soluble material. In certain advantageous embodiments, film 120 has a film thickness selected so that film 120 may be easily removed with water (e.g., when run though a conventional glass washer) In certain useful embodiments, film 120 has a film thickness that is less than about 8.0 microns. In certain advantageous embodiments, film 120 has a film thickness that is less than about 1.0 micron In one exemplary embodiment, film 120 has a film thickness of about 0.8 microns.

In some embodiments, coating 104 includes at least one silver layer, and film 120 comprises a composition that is non-corrosive to silver. In certain useful embodiments, film 120 comprises a material having a substantially neutral ph. In some useful embodiments, film 120 comprises a material having a ph of between about 5.0 and about 9.0. In certain advantageous embodiments, film 120 comprises a material having a ph of between about 5.0 and about 8.0. In certain particularly advantageous embodiments, film 120 comprises a material having a ph of between about 5.0 and about 7.0.

In some cases, a sheet in accordance with the present invention may have a less scratch-resistant side and a more scratch-resistant side. With reference to FIG. 2, for example, the side of sheet 100 comprising coating 104 may be less scratch-resistant than the side of sheet 100 comprising substrate 102 (e.g., in embodiments where coating 104 comprises material which is easily scratched (e.g., coating 104 is a silver based coating)). In an exemplary embodiment of the present invention, substrate 102 comprises glass (e.g., conventional soda-lime float glass) and coating 104 comprises a silver-based coating such as a silver-based low-emissivity coating. In this example, both glass and low-emissivity coating can be scratched, however, the coating 104 is less resistant to being scratched (i.e., less durable to mechanical abrasion) than the uncoated surface. Moreover, the scratches in the low-emissivity coating will be more noticeable and will be more likely to be rejected when compared to scratches in the glass.

In some cases, a sheet in accordance with the present invention may have a less porous side and a more porous side. In some embodiments of the present invention, a separator may overlay the less porous side of a sheet. When this is the case, the less porous side may be less prone to retain materials form the separator after cleaning This is particularly desirable in cases where sealant is to be bonded to the more porous side, as it avoids any problems (e.g., problems obtaining a durable, lasting bond with sealant) that might otherwise occur if the separator is applied to the more porous side and traces of the separator remain on the porous side even after removal of the separator. With reference to FIG. 2, for example, the side of sheet 100 comprising coating 104 may be more porous than the side of sheet 100 comprising substrate 102. In an exemplary embodiment of the present invention, the substrate 102 is a glass sheet having one coated major surface and one uncoated major surface and the coating 104 is a pyrolytically-applied coating (e.g., a pyrolytically-applied low-emissivity coating) that is more porous than the uncoated major surface of the glass sheet. the coating 104 in the present embodiments may be any porous pyrolytically-applied coating, such as those described in U.S. Pat. No. 5,698,262 the entire contents of which are incorporated herein by reference.

Figure 3:
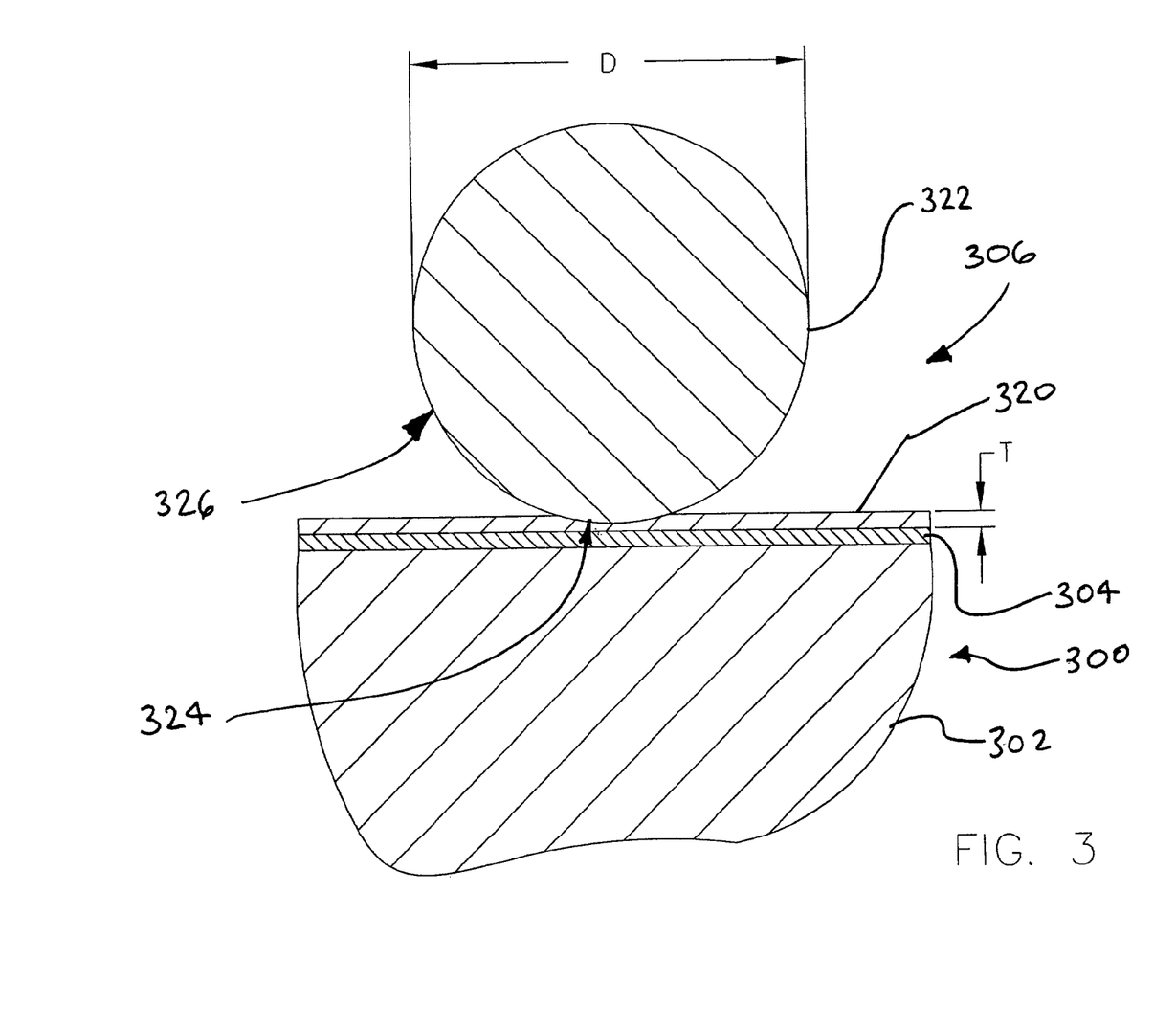
FIG. 3 is a cross sectional view of an assembly in accordance with an additional exemplary embodiment of the present invention.

FIG. 3 is a cross sectional view of an assembly in accordance with an additional exemplary embodiment of the present invention. The assembly of FIG. 3 includes a sheet 300 comprising a substrate 302 bearing a coating 304. A separator 306 is shown overlaying coating 304. Separator 306 of FIG. 3 comprises a film 320 and a plurality of particles 322. A covered area (e.g., a wetted area) 324 of each particle 322 is preferably adhered to film 320.

In FIG. 3, it may be appreciated that particle 322 has an exposed surface area (e.g., a non-wetted surface area) 326 that is generally larger than covered area 324 of particle 322. In certain useful embodiments, exposed surface area 326 is more than 10 times larger than covered surface area 324. In certain advantageous embodiments, exposed surface area 326 is more than 100 times larger than covered surface area 324. In certain particularly advantageous embodiments, exposed surface area 326 is more than 300 times larger than covered surface area 324.

In some applications, it may be desirable to selectively remove particle 322 from film 320, for example, when sheet 300 is cleaned prior to assembly. In some applications (e.g., the manufacture of insulating glass units) it is desirable that sheet 300 be free of contaminants when sheet 300 is adhesively bonded to another object. Providing a particle 322 having a covered area 324 which is small relative to exposed area 326 may facilitate cleaning of sheet 300 by allowing particle 322 to be easily knocked off of sheet 300, for example, by striking particle 322 with a water spray.

In FIG. 3, it may be appreciated that particle 322 has a diameter D which is larger than a film thickness T of film 320. In a preferred embodiment, film 320 has a film thickness which is less than the average diameter of the particles of separator 306. In certain advantageous embodiments, the difference between the film thickness and the average diameter of the particles is sufficient to prevent contact between film 320 and a second substrate resting on exposed area 326 of particle 322. It is important to note that some film materials may swell during transportation, for example, due to changes in temperature and/or humidity. When this is the case, swelling of film 320 is preferably taken into account when selecting the difference between the film thickness and the average diameter.

In certain useful embodiments, the average particle diameter is more than 10 times greater than the film thickness. In certain advantageous embodiments, the average particle diameter is more than 100 times greater than the film thickness. In certain particularly advantageous embodiments, the average particle diameter is more than 300 times greater than the film thickness.

Figure 4:
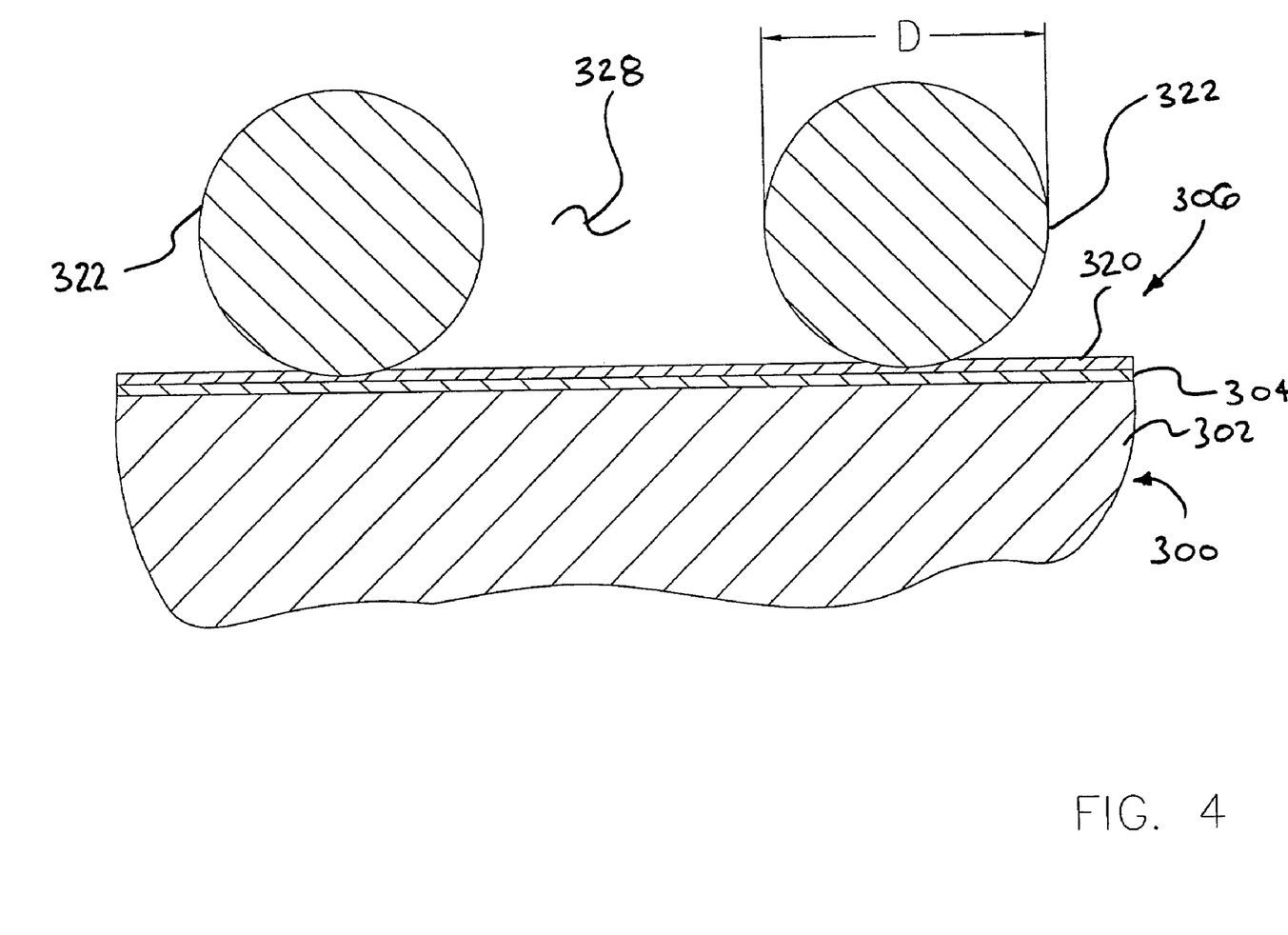
FIG. 4 is a cross sectional view of an additional assembly in accordance with an exemplary embodiment of the present invention.

FIG. 4 is a cross sectional view of an additional assembler in accordance with an exemplary embodiment of the present invention. The assembly of FIG. 4 includes a sheet 300 comprising a substrate 302 bearing a coating 304 and a separator 306 overlaying coating 304. In the embodiment of FIG. 4, separator 306 comprises a film 320 and a plurality of particles 322 adhered to film 320. In the embodiment of FIG. 4 particles 322 are separated from one another by a space 328.

In the illustrative embodiment of FIG. 4, space 328 has an extent that is similar to diameter D of a particle 322. In certain useful embodiments, the average spacing between adjacent particles is greater than the average diameter of the particles. In certain advantageous embodiments, an average spacing between adjacent particles is greater than about 5 times an average diameter of the particles. In certain particularly advantageous embodiments, an average spacing between adjacent particles is greater than about 30 times an average diameter of the particles. Adhering particles to film 320 in a generally spaced relationship may reduce the likelihood that a plurality of particles will cluster together.

Figure 5:
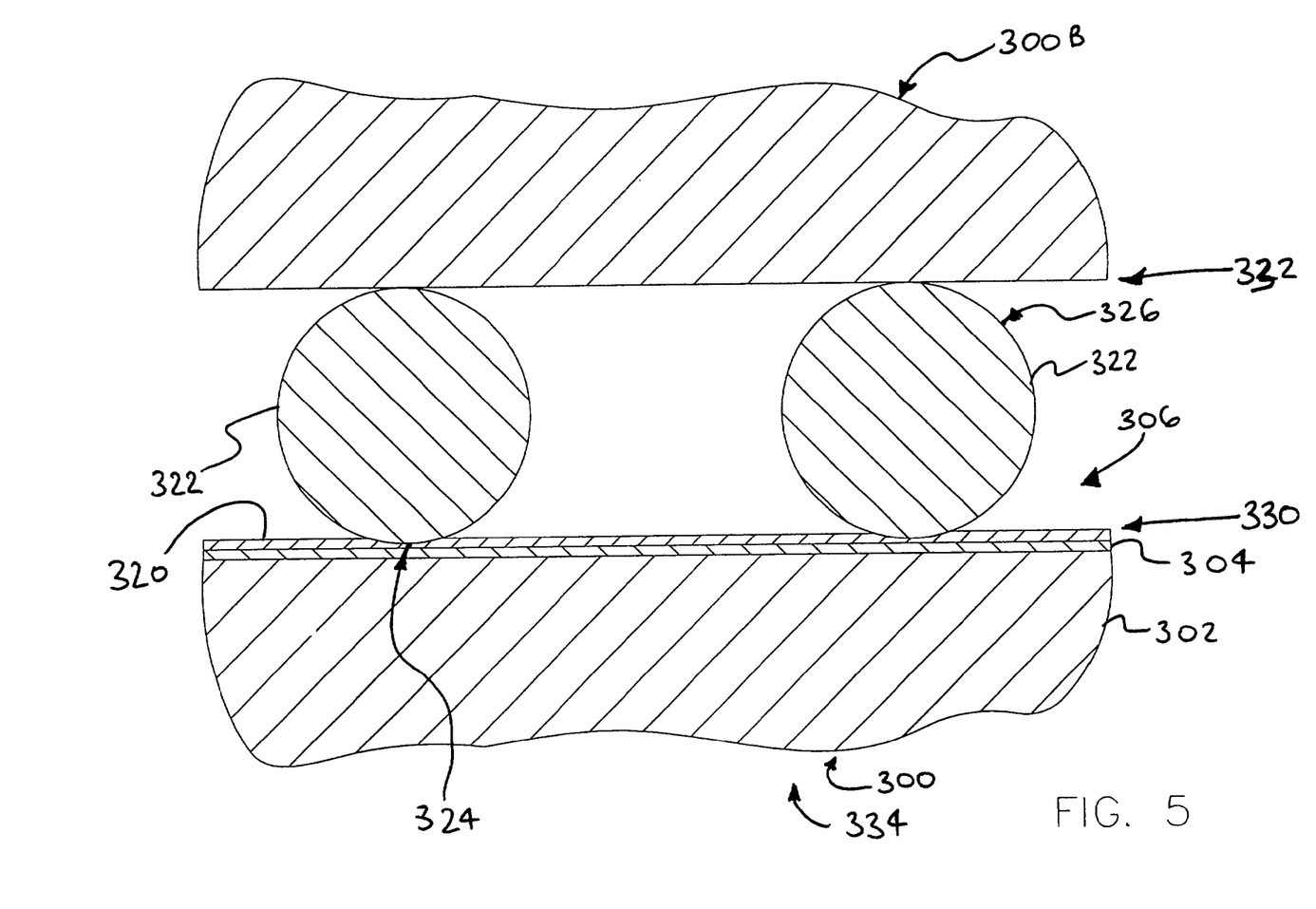
FIG. 5 is a cross sectional view of an assembly including the sheet and the separator shown in the previous figure.

FIG. 5 is a cross sectional view of an assembly 334 including sheet 300 and separator 306 shown in the previous figure. In the embodiment of FIG. 5, sheet 300 comprises a substrate 302 and a coating 304 overlaying substrate 302. In FIG. 5, separator 306 is shown overlaying coating 304.

In the embodiment of FIG. 5, a second sheet 300B is shown contacting an exposed area 326 of each particle 322. A covered area 324 of each particle 322 is preferably adhered to film 320. In FIG. 5, it may be appreciated that film 320 defines a first surface 330 of separator 306 and exposed area 326 of particles 322 define a second surface 332 of separator 306.

In some embodiments, first surface 330 is more sticky than second surface 332. When this is the case, second sheet 300B is preferably free to move relative to particles 322, while particles 322 are preferably fixed relative to sheet 300. Allowing relative movement between particles 322 and second sheet 300B may allow assembly 334 to shift in response to shock and vibration applied to assembly 334 during transportation. Preventing relative movement between particles 322 and sheet 300 may prevent particles 322 from creating trails or scratches in coating 304 of sheet 300.

Figure 6:
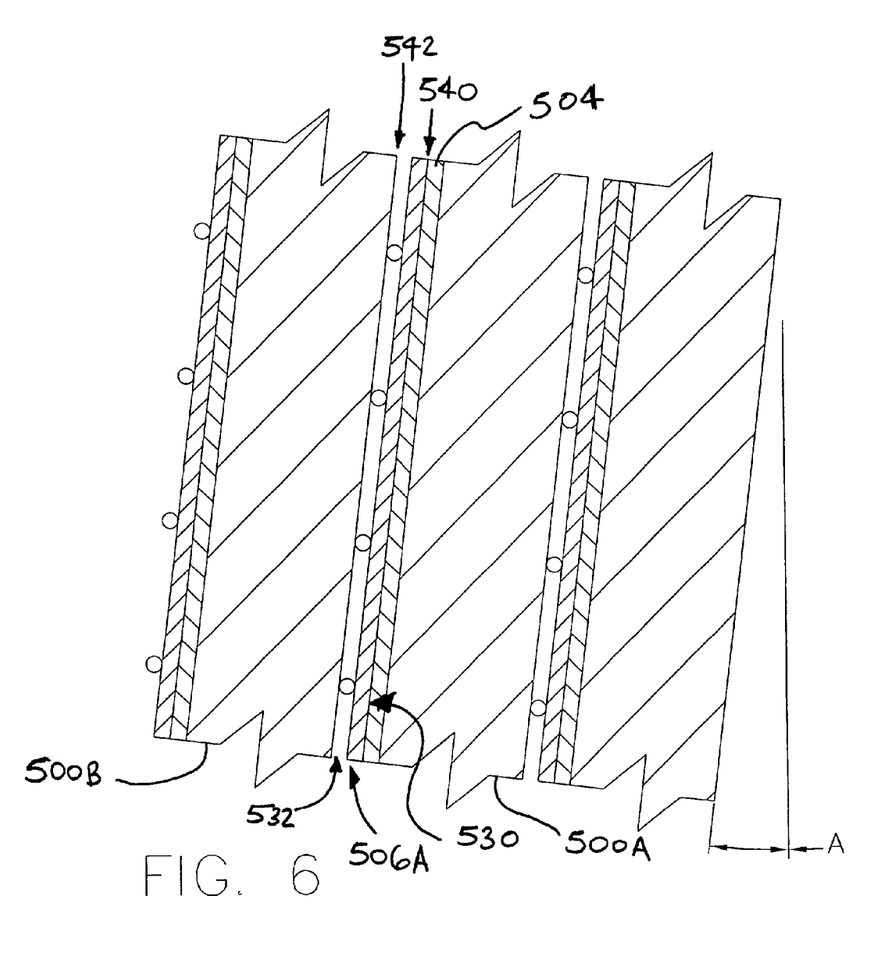
FIG. 6 is a cross-sectional view of an assembly in accordance with an additional exemplary embodiment of the present invention.

FIG. 6 is a cross-sectional view of an assembly 534 in accordance with an exemplary embodiment of the present invention. The assembly of FIG. 6 includes a plurality of sheets 500 arranged one next to the other to form assembly 534. Assembly 534 also includes a plurality of separators 506, with one separator 506 being interposed between adjacent sheets 500 of assembly 534. Each separator 506 forms a first interconnection with one of the adjacent sheets 500 and a second interconnection with the other of the adjacent sheets 500.

In the embodiment of FIG. 6, a first surface 530 of a separator 506A contacts a first sheet 500A at a first interconnection 540. A second surface 532 of separator 506A contacts a second sheet 500B at a second interconnection 542. In certain useful embodiments, first interconnection 540 has a first mechanical strength and second interconnection 542 has a second mechanical strength that is different from the first mechanical strength. In certain advantageous embodiments, the first mechanical strength is greater than the second mechanical strength for reducing the likelihood that relative movement will occur between the separator and a coating 504 of first sheet 500A. In some embodiments, for example, first interconnection 540 may comprise an adhesive interconnection and second interconnection 542 may comprise a friction interconnection.

Figure 7:
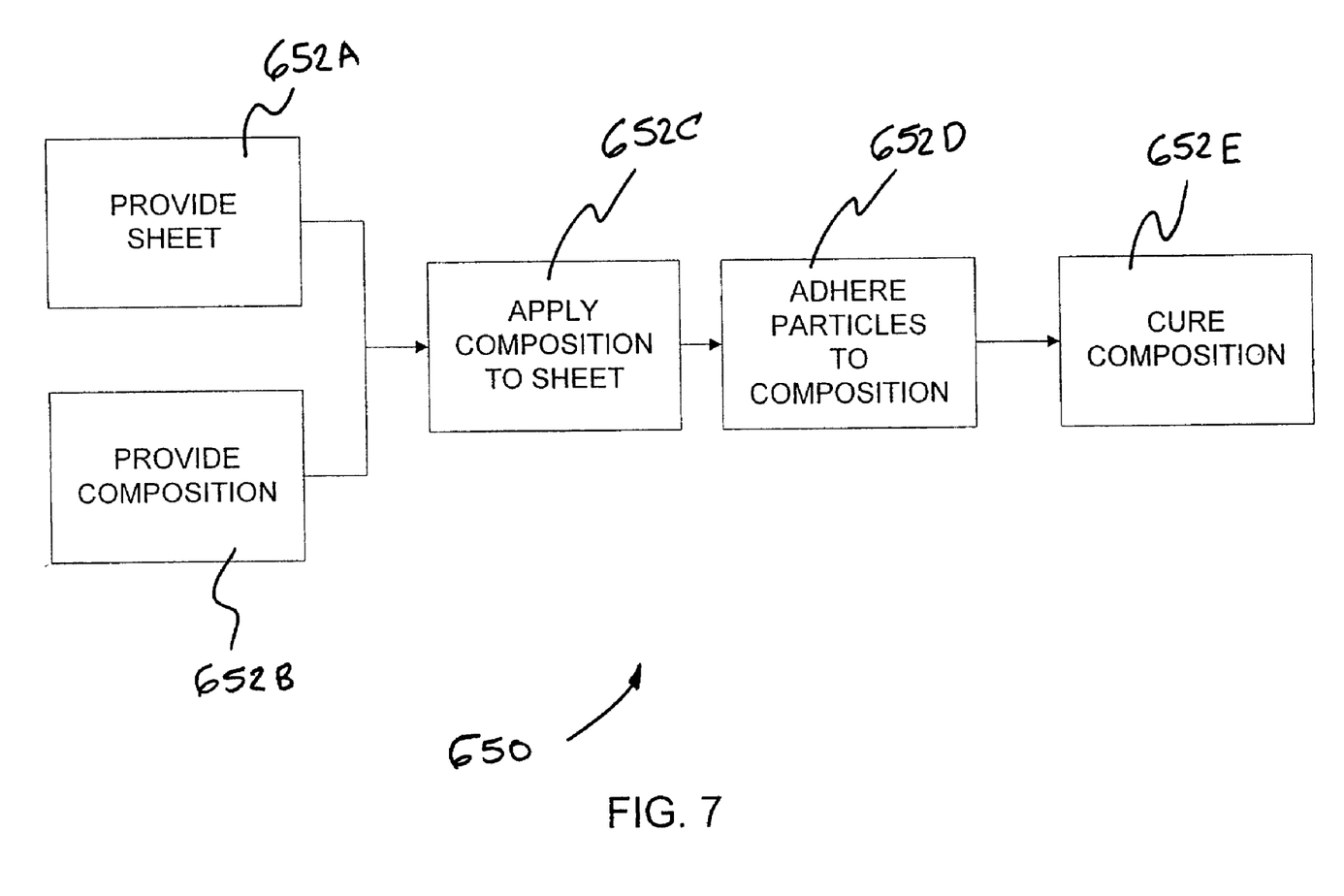
FIG. 7 is a flowchart illustrating an exemplary method in accordance with the present invention.

FIG. 7 is a flowchart 650 illustrating an exemplary method in accordance with the present invention. Block 652A of flowchart 650 comprises the step of providing a sheet. In some applications, a number of sheets may be provided by transporting those sheets on a conveyor.

Block 652B of flowchart 650 comprises the step of providing a composition. Methods in accordance with the present invention may be used with various compositions without deviating from the spirit and scope of the invention. In some embodiments, the composition comprises a masking material which is adapted to be sprayed onto a workpiece. In a preferred embodiment, the composition comprises a material having a first state in which the composition can be easily applied to a sheet and a second state in which the composition forms a tacky film adhered to the sheet. In some embodiments, the composition is curable to a third state in which the composition forms a less tacky film.

Block 652C of flowchart 650 comprises the step of applying the composition to the sheet. In a presently preferred method, the composition is sprayed onto the sheet. It should be appreciated that various processes may be used to apply the composition to the workpiece without deviating from the spirit and scope of the present invention. Examples of application processes which may be suitable in some applications include spraying, dipping, brushing, coating, and printing.

In some methods in accordance with the present invention, the composition forms a tacky film that is adhered to the sheet. Block 652D of flowchart 650 comprises the step of adhering particles to the composition. In some cases, the step of adhering a plurality of particles to the film may include the step of positioning the particles in a spaced relationship relative to one another so as to prevent clustering. In some preferred methods, the particles are positioned so that an average spacing between adjacent particles is greater than an average particle diameter.

Block 652E of flowchart 650 comprises the optional step of curing the composition. In some embodiments of the present invention, the composition is curable to a state in which the composition forms a less tacky film. Various curing processes may be used without deviating from the spirit and scope of the present invention. For example, the composition may be cured at about room temperature. By way of a second example, the composition may be cured at an elevated temperature.

With reference to the flowchart of FIG. 7, it will be appreciated that an exemplary method in accordance with the present invention may include the steps of applying a composition to the substrate so that the composition forms a film overlaying the coating, and adhering a plurality of particles to the film. In some cases, the step of applying the composition to the substrate is performed while the composition is in a first, liquid state and the step of adhering the plurality of particles to the film is performed while the composition is in a second state in which the composition forms a tacky film. Methods in accordance with the present invention may also include the step of curing the composition so as to form a less tacky film.

The protective film composition of this invention preferably comprises a water soluble polymer, a plasticizer, one or more alcohols, a plurality of particles and water.

The water soluble polymer may be any suitable polymer allowing for the film to be easily removed by an aqueous solution. In a preferred embodiments the water soluble composition comprises polyvinyl alcohol (PVA). Another suitable polymer includes but is not limited to polyvinyl chloride.

The plasticizer may be any plasticizer capable of allowing the film solution to move from a liquid form to a tacky form without completely solidifying. A film solution is considered tacky when it is neither in a liquid form or a solid form, but is rather in a soft, flexible and sticky form. Plasticizers are typically added to polymers to increase their flexibility and distensibility. They cause solutions to polymerize not to their fullest extent, but enough to become tacky rather than hard and solid. In a preferred embodiment, the plasticizer comprises glycerin. Glycerin is a commercial product whose principal component is glycerol. The terms glycerin, glycerine, and glycerol are often used interchangeably in this art and are for the purposes of this application considered to have the same meaning.

The one or more alcohols may include any alcohol or combination of suitable alcohols so that the film becomes tacky within a first pre-selected time period. Additionally, the film may advantageously become a less tacky film after the passage of a second pre-selected time period.

In some useful embodiments of the present invention, the first pre-selected time period is between about 2.0 seconds and about 30.0 seconds. In some advantageous embodiments of the present invention, the first pre-selected time period is between about 4.0 seconds and about 15.0 seconds.

In some useful embodiments of the present invention, the second pre-selected time period is between about 1.0 minute and about 5.0 minutes. In some advantageous embodiments of the present invention, the second pre-selected time period is between about 1.5 minutes and about 2.5 minutes.

The presence of alcohols speed up the polymerization process, causing the film to become tacky within a certain time period. Preferably, the alcohols comprise one or more alcohols each having a carbon content of less than 10 carbons. Even more preferably, the alcohols comprise one or more alcohols each having a carbon content of less than 6 carbons Alcohols that may be utilized in the composition of the present invention include, but are not limited to methanol, ethanol, propanol, propenol, butanol, butenol, pentanol, hexanol, heptanol, octanol, nonanol and decanol. In a preferred embodiment, the one or more alcohols comprises a combination of ethanol, methanol, and isopropyl alcohol.

The plurality of particles may include any particles capable of keeping two sheets of glass separated. The particles may comprise various materials without deviating from the spirit and scope of the present invention. Examples of materials which may be suitable in some applications include LUCITE.

In a preferred embodiment, the film composition comprises polyvinyl alcohol, glycerin, one or more alcohols, and water. In an even more preferred embodiment, the film composition comprises between about 1% to 15% polyvinyl alcohol, between about 0.2% to 8% glycerin, up to 25% one or more alcohols, and the remainder comprising water. In an even more preferred embodiment, the film composition comprises between about 2% to 5% polyvinyl alcohol, between about 1% to 2% glycerin, up to about 10% alcohol, and the remainder comprising water.

In another preferred embodiment, the film composition comprises polyvinyl alcohol, glycerin, ethanol, methanol, isopropyl alcohol, and water. In an even more preferred embodiment, the film composition comprises between about 2%-5% polyvinyl alcohol, between about 1%-2% glycerin, about 5% ethanol, about less than 1% methanol, about less than 1% isopropyl alcohol, and the remainder comprising water.

Numerous characteristics and advantages of the invention covered by this document have been set forth in the foregoing description. It will be understood, however, that this disclosure is, in many respects, only illustrative. Changes may be made in details, particularly in matters of shape size and ordering of steps without exceeding the scope of the invention. The invention's scope is, of course, defined in the language in which the appended claims are expressed.

What is claimed is:

1. In combination:
a sheet comprising glass and having a coating; and
a separator comprising a plurality of particles adhered to a film having a film thickness, the plurality of particles having an average particle diameter, the average particle diameter being more than about 10 times greater than the film thickness, the separator overlaying the coating, the film comprising a composition that forms at least two states, a first state for easy application and a second state forming a tacky film, and including a water soluble material, a plasticizer and one or more alcohols and being-easily removable with water.

2. An assembly, comprising:
a first sheet comprising glass, a second sheet comprising glass, and a separator interposed between the first sheet and the second sheet;
each sheet having a coating on at least one side; and
the separator comprising a plurality of particles adhered to a film having a film thickness, the plurality of particles having an average particle diameter, the average particle diameter being more than about 10 times greater than the film thickness, the separator interposed between the sheets and overlaying the coated side of the first sheet while providing for direct contact and relative movement between the particles and the second sheet, the film comprising a composition that forms at least two states, a first state for easy application and a second state forming a tacky film, and including a water soluble material, a plasticizer and one or more alcohols and being easily removable with water.

3. In combination:
a glass sheet bearing a coating;
a film having a film thickness overlaying the sheet;
the film carrying a plurality of particles having an average particle diameter, the average particle diameter being more than about 10 times greater than the film thickness; and
each particle having a covered area adhered to the film and an exposed area,
wherein the film is adhered to the coating, the film comprising a composition that forms at least two states, a first state for easy application and a second state forming a tacky film, and including a water soluble material, a plasticizer and one or more alcohols and being easily removable with water, and
wherein the coating includes at least one silver layer and the film comprises a composition that is substantially non-corrosive to the at least one silver layer of the coating.

4. In combination:
a glass sheet bearing a coating;
a film having a film thickness overlaying the sheet;
the film carrying a plurality of particles having an average particle diameter, the average particle diameter being more than about 10 times greater than the film thickness; and
each particle having a covered area adhered to the film and an exposed area,
wherein the film is adhered to the coating, the film comprising a composition that forms at least two states, a first state for easy application and a second state forming a tacky film, and including a water soluble material, a plasticizer and one or more alcohols and being easily removable with water, and
wherein the film has a pH of between about 5.0 and about 9.0.

5. The combination of claim 4, wherein the film has a pH of between about 5.0 and about 8.0.

6. The combination of claim 5, wherein the film has a pH of between about 5.0 and about 7.0.

7. An assembly, comprising:
a first sheet comprising a glass substrate and a coating overlaying the substrate, a second sheet, and a separator interposed between the first sheet and the second sheet;
the separator comprising a plurality of particles having an average particle diameter and a film having a film thickness fixing the particles to the first sheet, the average particle diameter being more than about 10 times greater than the film thickness, the film comprising a composition that forms at least two states, a first state for easy application and a second state forming a tacky film, and including a water soluble material, a plasticizer and one or more alcohols and being easily removable with water; and
the second sheet resting on exposed areas of the particles and being free to move relative to the particles.

8. The assembly of claim 7, wherein the second sheet comprises a substrate and a coating overlaying the substrate.

9. The assembly of claim 7, wherein the substrate of the first sheet is glass and the coating of the first sheet comprises a low-emissivity coating.

10. The assembly of claim 7, wherein the film defines a bottom surface of the separator and the exposed areas of the particles define a top surface of the separator.

11. The assembly of claim 10, wherein the bottom surface is more sticky than the top surface.

12. An assembly, comprising:
a first sheet comprising glass, a second sheet comprising glass, and a separator comprising a plurality of particles adhered to a film having a film thickness, the plurality of particles having an average particle diameter interposed between the first sheet and the second sheet, the average particle diameter being more than about 10 times greater than the film thickness, the film comprising a composition that forms at least two states, a first state for easy application and a second state forming a tacky film, and including a water soluble material, a plasticizer and one or more alcohols and being easily removable with water;
a first surface of the separator contacting a coating of the first sheet at a first interconnection having a first mechanical strength;
a second surface of the separator contacting the second sheet at a second interconnection having a second mechanical strength; and
the first mechanical strength being greater than the second mechanical strength for reducing the likelihood that relative movement will occur between the separator and the coating of the first sheet.

13. An assembly, comprising:
a first sheet comprising glass, a second sheet comprising glass, and a separator comprising a plurality of particles adhered to a film having a film thickness, wherein-each sheet comprises a substrate and a coating overlaying the substrate, the plurality of particles having an average particle diameter interposed between the first sheet and the second sheet and overlaying the coating of at least the first sheet or the second sheet, the average particle diameter being more than about 10 times greater than the film thickness, the film comprising a composition that forms at least two states, a first state for easy application and a second state forming a tacky film, and including a water soluble material, a plasticizer and one or more alcohols and being easily removable with water;
a first surface of the separator contacting the first sheet at a first interconnection having a first mechanical strength;
a second surface of the separator contacting the second sheet at a second interconnection having a second mechanical strength; and
the first mechanical strength being greater than the second mechanical strength for reducing the likelihood that relative movement will occur between the separator and the first sheet.

14. The assembly of claim 13, wherein the second interconnection is a friction interconnection.

15. The assembly of claim 13, wherein the first interconnection is an adhesive interconnection.

16. The assembly of claim 13, wherein the substrate is glass and the coating comprises a low-emissivity coating.

17. The assembly of claim 13, wherein the second interconnection is a friction interconnection between the substrate of the second sheet and the particles of the separator.

18. The assembly of claim 13, wherein the first interconnection is an adhesive interconnection between the coating of the first sheet and the film of the separator.

* * * * *